Patented May 17, 1932

1,859,036

UNITED STATES PATENT OFFICE

EVERETT J. HALL, OF NEW YORK, N. Y., ASSIGNOR TO METALS DISINTEGRATING COMPANY, INC., OF ELIZABETH, NEW JERSEY, A CORPORATION OF NEW JERSEY

METHOD AND MATERIAL FOR CLEARING DRAIN PIPES AND FOR OTHER USES

No Drawing. Application filed May 26, 1925. Serial No. 32,938.

This invention relates to a composition of matter intended for use in clearing out drain pipes and the like, which have been plugged up by the gradual deposit and accumulation of organic and other matter carried by fluids that pass through the pipe. In another aspect of the invention it relates to a novel method of causing the disintegration of such plugs. And there is also involved a method of producing a drain pipe cleaner whose effects may be substantially predetermined and calculated to best meet particular conditions.

It is known that caustic soda acts as a solvent or pulping agent for many things when it is dissolved in water. Heat and agitation both materially assist in its action. Caustic soda, when dissolved in water, produces heat. When the proportions are correct and the rate of solution is sufficiently rapid, a temperature in excess of the boiling point of water may be obtained. Caustic soda, when dumped into water, particularly in a large excess of water, may hydrate and form a solid compact cake, which dissolves very slowly. If, however, the water is stirred at the time of addition, solution is almost instantaneous. Certain elements, when added to a solution of caustic soda, are acted upon with the production of heat and hydrogen. By the addition of such elements as aluminum and silicon, and the chemical action which ensues, it is possible to raise the temperature of a cold solution above the boiling point of water. It is possible, in the aforementioned case to exceed the boiling point of water, due to the fact that the addition of a soluble substance to water in nearly all cases raises its boiling point.

These various facts have been made use of in the preparation of commercial drain or soil pipe cleaners, composed of caustic soda and aluminum chips or shavings. The articles put upon the market possess certain weaknesses, which are due to the too great activity of aluminum powder and caustic soda solutions. This great activity gives a short duration of action, and the development of a large amount of heat in a very short space of time, which heat is largely dissipated in the form of steam, so that it is not expended on the plug but is practically wasted. If the rate of action could be retarded and the heat produced more slowly it would not then be dissipated to such an extent in the water vapor form, but would serve to maintain the solution at an elevated temperature for a longer time, thereby prolonging the action of the hot caustic soda solution upon the material to be disintegrated, decomposed, or dissolved. Further, the instant reaction of caustic soda solution and aluminum gives proportionately an instant liberation of gas and this gas has a buoyant effect upon the aluminum, causing it to rise in a froth above the normal surface of the liquid. And while the agitation produced by this gas is instantaneous, it is at the surface of the liquid, whereas it should be at the bottom, in order to facilitate the solution of the caustic soda, and, also, to generate the heat of action in closer proximity to the stoppage in a pipe.

These objections are so pronounced that probably 75% of the heat is produced in a froth above the normal level of the liquid, and with any reasonable amount of aluminum in the mixture a greater or less proportion of the caustic soda remains undissolved when the action has ceased, and hence likely to cake. This undissolved caustic soda can, under certain conditions, produce a tighter obstruction in a pipe than the usual things which cause stoppage.

I have made experiments with two ways of overcoming this difficulty:

(1) Is to use pieces of aluminum so large that the surface per unit of weight is decreased to a point where they will not be held in suspension by the gas action, but will gravitate to the bottom of the solution. Difficulties are met in following this course, in that the pieces of aluminum have to be of an appreciable size, that is, so large that they can not be mixed satisfactorily with the fine caustic soda. Pieces of aluminum probably at least ¼ inch and possibly ½ inch diameter would be required.

(2) By using a material of slower action, it is possible then to subdivide it to a point where intimate mixture with the caustic soda in the dry state is possible. The element silicon proves to be such a material.

It has been found by experiments that the rate of action between silicon and caustic soda solution is so slow, particularly in the cold, that the material must be ground excessively fine in order to develop sufficient speed to produce a high temperature. To analyze this statement—a given weight of silicon reacting with a certain weight of caustic soda will produce a definite number of heat units. If the reaction takes place, in one minute, the temperature rise will be well above the boiling point of water. On the other hand, if this same reaction takes place over a period of 24 hours, the heat will be dissipated almost as rapidly as it is produced and a rise of only one or two degrees may take place. The degree of fineness required for quick action is such that the silicon readily goes in solution and the action is not sufficiently prolonged. Also, these very fine particles are easily held in suspension, interfering with deep seated action. By adding to the very fine material a properly selected coarser grade this deficiency is compensated for. In other words, the coarser material, having less surface per unit of weight of particle, is less readily held in suspension, goes to the bottom of the body of liquid and produces the desired deep-seated action. Also, having less surface for attack, it takes longer to go into solution, and thereby prolongs the agitation. Further, this coarse material is very slowly acted upon in the early stages when the solution is cold, but as the temperature rises and the amount of caustic soda in solution increases this coarse material is acted upon with sufficient vigor to give reasonable agitation.

By the use of two grades of material, it is possible to effect some adjustment, that is, initial activity can be varied by the degree of fineness of the fine material, and the prolongation of action and the deep-seatedness of action can be controlled by a selection of the proper coarse grade.

Another alternative to working with one element, like silicon, is to form a mixture or an alloy of two materials—one active and the other less active. Thus I may produce most satisfactory active material by combining silicon and aluminum. A substance such as aluminum, which is too active, developing most of the heat at the surface of the liquid and dissipating most of its energy by the evaporation of water, can be used as a starter or primer, and a substance such as silicon, with a much slower action, can be mixed with the aluminum and used to carry on, and also to obtain action in depth, causing complete solution of the caustic alkali. Or an alloy of these two metals may be used. For example, silicon must be ground very fine in order to obtain sufficient activity to initiate reaction, and if the solution is a bit dilute it may fail to produce heat sufficiently rapid to build up a high temperature. The alloying with the silicon of a small amount of aluminum increases the activity. In the practical application of this development a combination of the proper mixing or alloying of two substances, and a proper controlling of the grain-size will give the best results. Silicon and aluminum alloys within the range that might be used for these purposes, are brittle and therefore capable of mechanical disintegration.

The aluminum-and-silicon combination may be termed an "aluminum-plus" content, constituting, with the alkali metal hydroxide, a heat producing compound; "aluminum-plus content" being understood to mean aluminum which is aggregated with a non-metal or a material, such as silicon, which latter is itself incapable of practical use to produce the results, such as control, etc., herein set forth.

It is a fact that aluminum produces more heat per unit of weight than silicon, and this fact would give aluminum a decided advantage if the heat were not developed at the surface and dissipated.

The advantages of silicon lies in the production of heat and agitation of the lower levels of the liquid, where it will do the most good; and in the fact that by properly grading the material, all the caustic soda is taken in solution.

Where a mixture or alloy of two metals or materials is employed, one of them may be mainly depended upon for the production of heat and gas, the other functioning as a deterrent or accelerator of the heat and gas production, as the case may be. The result is a definite intelligent control, the second material affecting definitely and to a predetermined extent the production of heat and gas.

It will be appreciated that materials, sizes and relativities may be varied within considerable limits, and that exact specifications as to these factors are unnecessary, inasmuch as they will be empirically and very easily worked out to meet practical conditions.

My inventions are based upon an appreciation of the deficiencies of commercial compositions heretofore employed, and upon my discovery of thoroughly practical ways to make such compositions more effective. It is this view of the inventions that the following claims are to be construed.

I claim:

1. A composition of matter for the use set forth, comprising alkali metal hydroxide, and particles comprising aluminum alloyed with silicon, the particles being graded definitely into predetermined different sizes.

2. A heat producing compound comprising alkali metal hydroxide and an "aluminum-plus content".

In testimony whereof I affix my signature.

EVERETT J. HALL.